United States Patent
Reynolds et al.

(10) Patent No.: US 6,707,957 B1
(45) Date of Patent: Mar. 16, 2004

(54) COMPENSATING FOR POLARISATION MODE DISPERSION IN OPTICAL TRANSMISSION FIBERS

(75) Inventors: Andrew L Reynolds, Bearsden (GB); Sotiris E Kanellopoulos, London (GB); Vincent Handerek, Gravs (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/024,996

(22) Filed: Dec. 18, 2001

(51) Int. Cl.[7] .............. G02B 6/27; G02B 6/26; G02B 6/20; H04B 10/18
(52) U.S. Cl. ............ 385/11; 385/27; 385/125; 398/81; 398/147; 398/159
(58) Field of Search ............... 385/123–128, 385/11, 15, 27; 398/81, 119, 136, 192, 147–149, 158, 159; 359/140, 161, 165, 337.2, 566, 573; 356/305, 328

(56) References Cited

U.S. PATENT DOCUMENTS

| | | | | |
|---|---|---|---|---|
| 4,725,113 A | * | 2/1988 | Chang et al. ............ | 385/11 |
| 4,756,589 A | * | 7/1988 | Bricheno et al. .......... | 385/39 |
| 5,309,540 A | * | 5/1994 | Turpin et al. ............ | 385/123 |
| 5,452,314 A | * | 9/1995 | Aronson .................. | 372/20 |
| 5,559,907 A | * | 9/1996 | Inniss et al. ............. | 385/11 |
| 5,732,179 A | * | 3/1998 | Caneau et al. ........... | 385/131 |
| 6,097,870 A | * | 8/2000 | Ranka et al. ............. | 385/127 |
| 6,137,924 A | * | 10/2000 | Strasser et al. ........... | 385/11 |
| 6,266,457 B1 | * | 7/2001 | Jacob ..................... | 385/11 |
| 6,271,952 B1 | * | 8/2001 | Epworth ................... | 359/161 |
| 6,356,684 B1 | * | 3/2002 | Patterson et al. .......... | 385/37 |
| 6,381,388 B1 | * | 4/2002 | Epworth et al. ........... | 385/37 |
| 6,400,869 B2 | * | 6/2002 | Pan et al. ................ | 385/37 |
| 6,417,948 B1 | * | 7/2002 | Chowdhury et al. ....... | 359/161 |
| 6,438,277 B1 | * | 8/2002 | Eggleton et al. .......... | 385/1 |
| 6,453,095 B2 | * | 9/2002 | Feng et al. .............. | 385/37 |
| 6,515,778 B1 | * | 2/2003 | Epworth et al. .......... | 385/37 |
| 6,546,170 B1 | * | 4/2003 | Eyal et al. .............. | 385/43 |
| 6,556,732 B1 | * | 4/2003 | Chowdhury et al. ....... | 385/11 |
| 6,560,014 B1 | * | 5/2003 | Trzecieski et al. ........ | 359/484 |
| 6,594,408 B1 | * | 7/2003 | Noe ...................... | 385/11 |
| 2002/0005969 A1 | * | 1/2002 | Ranka et al. ............ | 359/161 |
| 2002/0061176 A1 | * | 5/2002 | Libori et al. ............ | 385/125 |
| 2002/0071646 A1 | * | 6/2002 | Eggleton et al. ......... | 385/125 |
| 2002/0101648 A1 | * | 8/2002 | Arie et al. .............. | 359/326 |
| 2002/0122625 A1 | * | 9/2002 | Berthelot et al. ......... | 385/37 |
| 2002/0159139 A1 | * | 10/2002 | Koplow et al. ........... | 359/342 |
| 2002/0168165 A1 | * | 11/2002 | Chien et al. ............. | 385/128 |
| 2002/0172486 A1 | * | 11/2002 | Fermann .................. | 385/128 |
| 2002/0191912 A1 | * | 12/2002 | Robinson et al. ......... | 385/37 |
| 2003/0039442 A1 | * | 2/2003 | Bond et al. .............. | 385/37 |
| 2003/0059195 A1 | * | 3/2003 | Brennan, III et al. ...... | 385/146 |
| 2003/0068130 A1 | * | 4/2003 | Gao ...................... | 385/37 |
| 2003/0077037 A1 | * | 4/2003 | Ovadia et al. ........... | 385/37 |

FOREIGN PATENT DOCUMENTS

WO     WO 9932863 A1 * 7/1999 ............ G01L/1/24

* cited by examiner

*Primary Examiner*—John D. Lee
(74) *Attorney, Agent, or Firm*—Barnes & Thornburg

(57) ABSTRACT

Compensating for polarization mode dispersion in a birefringent optical transmission fibre is achieved by controlling the birefringence of the fibre. The difference in group velocity of the orthogonal polarization states of an optical signal transmitted over the fibre is monitored to generate an error signal representing the difference. The birefringence of the fibre is adjusted accordingly to minimize the difference and thereby provide dynamic compensation. Birefringence control may be achieved by a non-linear fibre grating written into the fibre to impose a differential time delay. The fibre may be a side hole fibre (SHF), a holey fibre (HF), a photonic crystal fibre (PCF), or any other suitable microstructure fibre. The fibre may have stressing rods, may be tapered along its length and may be controlled electrically, mechanically, acoustically or thermally by spaced heating elements.

20 Claims, 2 Drawing Sheets

COMPENSATING FOR POLARISATION MODE DISPERSION IN OPTICAL TRANSMISSION FIBERS

FIELD OF THE INVENTION

The invention relates to a technique for compensating for polarisation mode dispersion in optical transmission fibres. The invention also includes an optical transmission fibre incorporating means to compensate for polarisation mode dispersion. The invention further relates to an optical signal when subjected to such a fibre and to an equaliser for effecting such compensation.

BACKGROUND TO THE INVENTION

Optical transmission fibres for use in optical transmission systems typically comprise a protective jacket surrounding a lower index cladding material enclosing a higher index optical transmission medium capable of supporting optical transmission along its length with little or no signal loss. Light is confined in the core region within such conventional step index fibres by total internal reflection as a result of the step difference in refractive index between the core and the cladding. The fibre and its cladding are near perfect circles in cross-section.

However, manufacturing tolerances, conditions of use, environmental factors and so on, give rise to imperfections in the geometric circularity of the fibres. This creates birefringence in the fibre, resulting in orthogonal polarisation states travelling at different group velocities within the fibre. Over long distances, the delay can be sufficiently cumulative that the original optical signal is effectively scrambled. This type of distortion, where orthogonal polarisation states travel at different group velocities, is known as polarisation mode dispersion (PMD).

Previous attempts at overcoming or compensating for PMD have employed either or both electrical and optical compensation techniques. Electrically based approaches are constrained to operate after the optical signal has been processed through an optical receiver (post-receiver) and are dependent on the speed of the electronics. Such electrical approaches have been found to be unsuitable for long-haul fibre links.

Optical PMD compensation techniques tend to focus on splitting the orthogonal polarisation states and delaying one relative to the other using free space optics or other optical components or, alternatively, writing a non-linear grating onto a high birefringence optical fibre. This latter approach has met with some success. The present invention aims to improve PMD compensation.

SUMMARY OF THE INVENTION

According to a first aspect of the invention, a method for compensating for polarisation mode dispersion in a birefringent optical transmission fibre, comprises controlling the birefringence of the fibre.

In a second aspect, the invention comprises a birefringent optical transmission fibre and means for controlling the birefringence of said fibre, whereby to compensate for polarisation mode dispersion in said fibre.

Polarisation mode dispersion control is preferably effected by writing a non-linear fibre grating in the fibre whereby to provide a means for imposing a differential time delay to the orthogonal polarisation states arising from the effects of polarisation mode dispersion such as to compensate for said polarisation mode dispersion.

The birefringence may be imposed in the fibre by a selection of any of the following options, namely introducing correctly positioned holes in the fibre so as to create a side hole fibre (SHF), a holey fibre (HF), a photonic crystal fibre (PCF) or any other suitable microstructure fibre.

The fibre grating is preferably a chirp or apodisation type grating or may be of any other suitable design. Variations in the properties of the birefringence and/or the grating are preferably performed by mechanical, electrical, thermal or acoustic means or methods.

The fibre can be tapered over part or all of its length. The micro-holes in the fibre may be filled with thermally sensitive material to create stressing rods in order to impose a mechanical stress by which to control birefringence. A thermal gradient can be provided over all or part of the length of the fibre. The fibre can be constructed in such a way that the fundamental transmission mode interacts with any in-fill material in the micro-holes so as to induce electro- or thermo-optic effects or voltage induced refractive index changes, or similar refractive index altering effect, in either or both of the fibre or the in-fill material that can be utilised to alter the mode shape and, consequently, the birefringence of the fibre. Any combination of these forms of fibre construction and birefringence control can be used in accordance with the invention.

Control of birefringence can be enhanced by providing additional means, such as stress rods, to alter the stress within the fibre and thereby the modal field pattern and therefore the birefringence of the fibre.

BRIEF DESCRIPTION OF THE DRAWINGS

The invention will now be described with reference to the following drawings, in which.

DETAILED DESCRIPTION OF THE ILLUSTRATED EMBODIMENTS

As already mentioned, polarisation mode dispersion arises from the different group velocities attained by orthogonal polarisation states arising from non-perfect circularity of the fibre cross-section and hence birefringence of the fibre. The present invention takes advantage of the effects of birefringence to compensate for the polarisation mode dispersion. It is therefore an advantage to the invention, but not a necessity, to use a fibre having an inherently high birefringence at the outset.

It is known that PCF and HF fibres are highly elliptical in cross section as a result of asymmetries introduced in the manufacturing process. This gives the fibres a higher inherent birefringence than in alternative so-called high birefringence fibres. PCF/HF fibres are made using a variety of techniques, primarily by systematically reducing a pre-form in size to form the geometrically micro-structured optical fibre. For example, the pre-form can be created by micro-drilling an optical pre-form or by bundling capillaries into the required geometry. The resultant micro-structured fibre often consists of a geometrical tiled pattern of air holes introduced along the length of the host material. The fibre may be single material but it is not essential to the invention since a mixture of materials could still give the required birefringence, so long as the individual strands making up the fibre are correctly positioned geometrically.

The fibre may also be created in a similar drawing process but where the pre-form is made from more than one material or doped materials. In this manner the resultant fibre is still micro-structured but does not contain air holes. The materials chosen may be responsive to various optical effects, thermo-, electro-optic for example as outlined elsewhere in the present specification, allowing control over the birefringence of the fibre.

Figure 1:
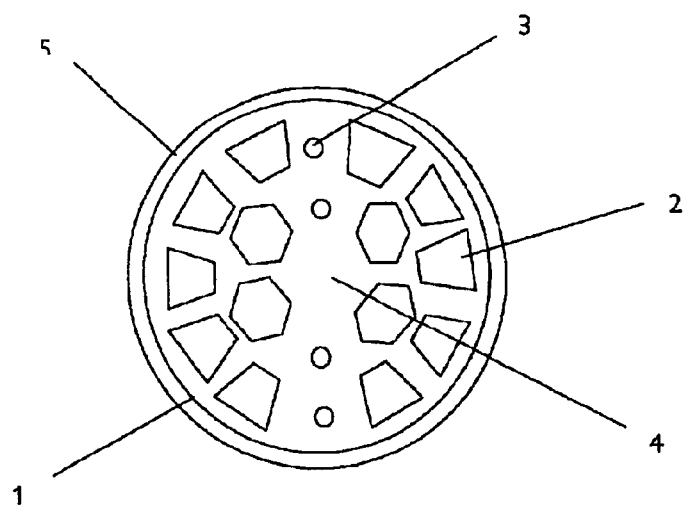
FIG. 1 is a schematic representation of a cross-section through a micro-structured optical fibre.

FIG. 1 Illustrates schematically a cross section through a highly birefringent optical fibre. It consists of a core 1 of silica or other suitable material in which a plurality of micro-holes 2, 3 are formed by any of the techniques mentioned above. A central core region 4 with no air holes results. The refractive index of this region is considerably increased relative to the surrounding area. This core region supports optical transmission by total internal reflection of light propagating in the fibre. The surrounding material containing the micro-holes constitutes a holey cladding round the central core region. A solid silica jacket 5 is provided around the core material 1 for protection.

Figure 2:
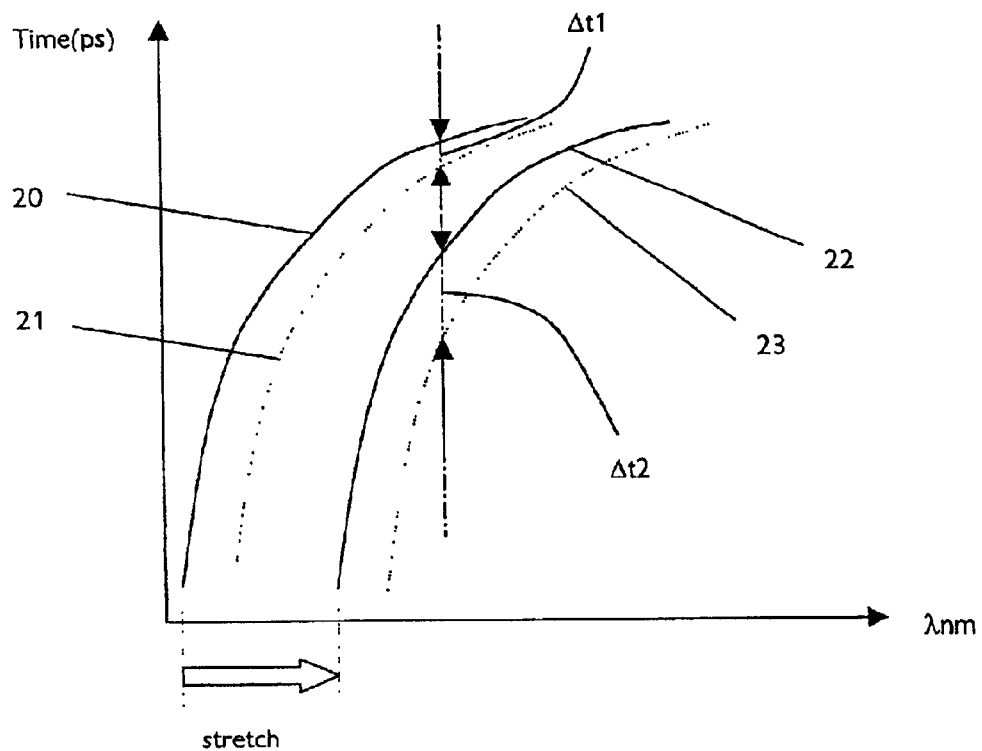
FIG. 2 is a graph representing the effects of polarisation mode dispersion on the group velocity of the different polarisation states.

FIG. 2 is a graph representing the effects of polarisation mode dispersion on the group velocity of the two orthogonal polarisation states in an optical fibre. The incoming signal has polarisation components along both the fibre's fast and slow axes, as indicated by the solid line 20 and the dotted line 21 respectively. The graph shows the differential time delay between the fast axis and the slow axis being $\Delta t1$. As discussed above, this differential delay contributes to distortion in the signal propagated in the fibre.

Fibre gratings, such as fibre Bragg gratings (FBG) are known to introduce a time delay in the signal subjected to the effects of the grating. The amount of delay can be controlled by varying certain parameters of the grating, for example by adjusting the pitch of the grating by mechanical stretching. Referring again to FIG. 2, the fibre is assumed to include a grating, such as a FBG. When the grating is stretched, in the direction indicated by the arrow, the effect is to shift the curves 20, 21 to the new positions 22, 23 respectively. For any given wavelength $\lambda i$, the time differential can be seen to have increased to the value $\Delta t2$, which is greater than the previous value $\Delta t1$. By tailoring the amount by which the grating can be used to adjust the differential time delay between the polarisation states, the polarisation mode dispersion can be substantially completely compensated.

Stress rods may therefore be added to the construction of the fibre to permit the characteristics of the grating to be controlled, thereby changing the modal field pattern within the core and consequently the birefringence of the fibre. This control can be additional to any other means for varying the characteristics of the grating.

Convenient techniques for altering the parameters of the grating include mechanical, electrical, thermal and acoustic means and methods, as well known in the art. To be more specific, stress rods can be incorporated into the fibre such that the application of a mechanical force is transferred to the grating to alter its pitch, for example. Spaced or continuous heating element(s) can be provided to regulate the length of the grating and/or influence the birefringence of the fibre material. Controlled variation of the grating length and/or refractive index can be effected locally, for example by any of the techniques just mentioned, or over the whole of the fibre length. The same or similar techniques could be applied to vary the birefringence of the fibre.

These and other techniques are well within the knowledge and capabilities of the average skilled man in the art and do not require dedicated description for the invention to be put into effect. However, for the avoidance of doubt, the following options are specifically mentioned as embodiments of the present invention. The fibre may be tapered along its whole length. This improves the capacity for thermal adjustment of the required parameters.

Figure 3:
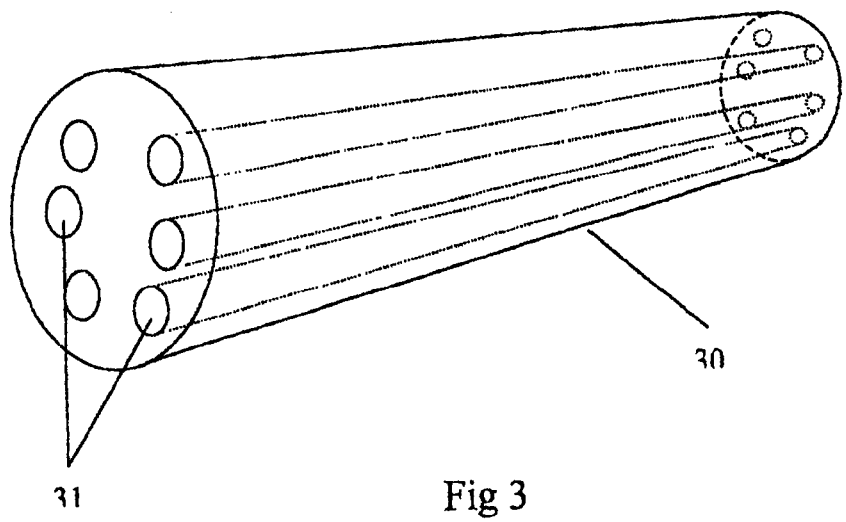
FIG. 3 is a perspective view of a tapered fibre.
Figure 4:
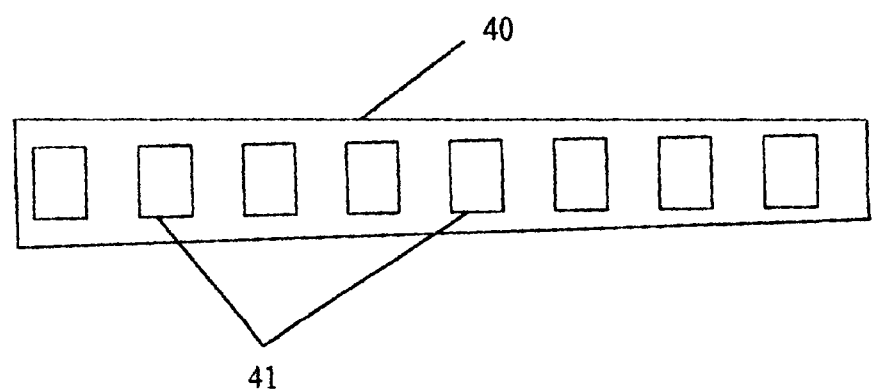
FIG. 4 is a side elevation of a tapered fibre with spaced heating elements.

An example is illustrated in FIGS. 3 and 4. The fibre 30 in FIG. 3 is provided with a plurality of cores 31 as before. In this case, however, the fibre tapers in cross-section from one end to the other. The taper may be linear but it is not essential. In FIG. 4, a series of spaced heating elements 41 are provided along the length of the tapered fibre 40. The heating elements can be selectively energised to impose localised heating at selected parts of the fibre. In a further variation, a thermal gradient can be established over part or all of the length of the fibre, enabling thermal control to be effected more precisely.

Alternatively, the fibre micro-holes can be filled with thermally sensitive material, such as polymer material, in order to create stressing rods by which control of birefringence can be more readily achieved. In a yet further variation, the fibre itself may be constructed so that the fundamental mode of the fibre is designed to interact with the in-fill materials of the micro-holes to induce an electro-optic effect which alters the mode shape and therefore the birefringence of the fibre.

Any combination or permutation of any of the known techniques and those specifically mentioned above can be used to control both the grating and/or the birefringence of the fibre.

Where control is effected locally, compensation can be performed at the receive end and/or at the transmit end of a communication link incorporating a fibre in accordance with the invention. Similarly, where control is effected "globally", i.e. over the whole length of the fibre, it can be initiated from either the transmit end and/or the receive end of the transmission link.

Figure 5:
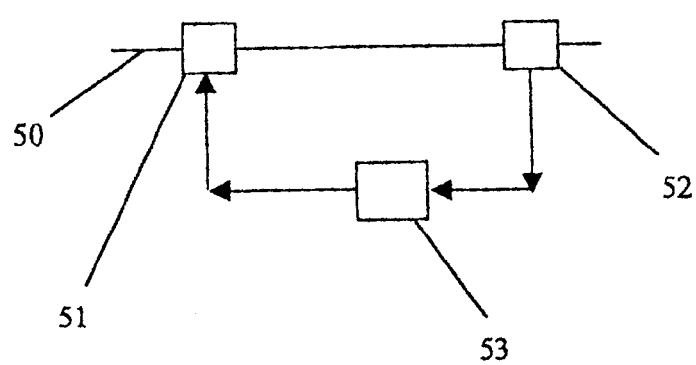
FIG. 5 is a schematic representation of a control system for the fibre.

Control can be empirical or can be made automatic. As indicated schematically in FIG. 5, a fibre 50 with birefringence control means 51, in accordance with the invention, is coupled to a sensor 52 for sensing the difference in group velocity of the orthogonal polarisation states within the fibre. This difference signal is utilised in error signal generator 53 to generate an error signal. The error signal is used by the control means 51 to effect control of whatever compensation mechanism or technique or combination thereof is/are employed so as to counteract the sensed difference and tend to reduce it to zero. In this sense, the invention provides an automatic equaliser adapted to compensate for polarisation mode dispersion in a fibre.

The invention is of particular benefit in that it, in its preferred embodiments, it is an all-optical, in-fibre compensation device that can be employed in optical fibre communication links, systems or networks to provide dynamic compensation for polarisation mode dispersion. The invention offers increased levels of control over and above existing methods and techniques.

What we claim is:

1. An element for an optical communication system, the element being arranged to introduce a variable differential group delay between orthogonal polarization modes of an input optical signal, thereby to compensate for polarisation mode dispersion in the optical communication system, the element comprising:

a birefringent, micro-structured optical waveguide; and a controller arranged to adjust the birefringence of the waveguide, thereby to vary the differential group delay introduced.

2. An element according to claim 1, wherein the waveguide is an optical fibre exhibiting a high degree of birefringence.

3. An element according to claim 2, wherein the optical fibre is one selected from the group consisting of: a holey fibre (HF); a side hole fibre (SHF) and a photonic crystal fibre (PCF).

4. An element according to claim 2, wherein the optical fibre comprises a non-linear fibre grating.

5. An element according to claim 4, wherein the fibre grating is a fibre Bragg grating (FBG).

6. An element according to claim 5, wherein the optical fibre is formed to hold rods of a thermally sensitive material formed within-the micro-structure of the fibre and wherein the controller is arranged to adjust the birefringence of the fibre by subjecting the thermally sensitive rods to heat.

7. An element according to claim 6, wherein the fibre is tapered over at least part of its length.

8. An element according to claim 6, wherein the controller is arranged to provide a thermal gradient over at least part of the length of the fibre.

9. An element according to claim 2, wherein the fibre comprises micro-holes filled with a material and arranged such that a fundamental transmission mode of the fibre interacts with the material to induce an electro-optic effect thereby altering the mode shape and birefringence of the fibre.

10. A variable differential group delay comprising the element of claim 1 and a sensor arranged to sense the difference in group velocities between the orthogonal polarisation modes of an optical signal; the sensor being coupled to the controller to cause the controller to adjust the birefringence of the waveguide to counteract the sensed difference in group velocities.

11. A method of compensating for polarisation mode dispersion in an optical communication system, the method comprising:

providing a birefringent, micro-structured optical waveguide arranged to introduce a differential group delay between orthogonal polarisation modes of an input optical signal, and adjusting the birefringence of the waveguide, thereby to vary the differential group delay introduced.

12. A method according to claim 11, wherein the waveguide is an optical fibre exhibiting a high degree of birefringence.

13. A method according to claim 12, wherein the optical fibre is one selected from the group consisting of: a holey fibre (HF); a side hole fibre (SHF) and a photonic crystal fibre (PCF).

14. A method according to claim 12 wherein the optical fibre comprises a non-linear fibre grating.

15. A method according to claim 14, wherein the fibre grating is a fibre Bragg grating (FBG).

16. A method according to claim 15, wherein the optical fibre is formed to have rods of a thermally sensitive material formed within the micro-structure of the fibre and wherein the step of adjusting the birefringence is performed by subjecting the thermally sensitive rods to heat.

17. A method according to claim 16, wherein the fibre is tapered over at least part of its length.

18. A method according to claim 16, wherein a thermal gradient is provided over at least a part of the length of the fibre.

19. A method according to claim 12, wherein the fibre comprises micro-holes filled with a material and arranged such that a fundamental transmission mode of the fibre interacts with the material to induce an electro-optic effect thereby altering the mode shape and birefringence of the fibre.

20. A method according to claim 11, comprising sensing the difference in group velocities between orthogonal polarization modes of an input optical signal and performing the step of adjusting the birefringence of the waveguide to counteract the sensed difference in group velocities.

* * * * *